C. D. JOHNSON & L. F. JOHNSTON.

Wire-Fences.

No. 8,078. Reissued Feb. 12, 1878.

Witnesses

R. W. Fenshaw

C. L. Parker

Inventors: Charles D. Johnson,
Levi F. Johnston.

By Attorney George H. Christy

N. PETERS, PHOTO-LITHOGRAPHER, WASHINGTON, D. C.

UNITED STATES PATENT OFFICE.

CHARLES D. JOHNSON AND LEVI F. JOHNSTON, OF MARSHALLTOWN, IOWA.

IMPROVEMENT IN WIRE FENCES.

Specification forming part of Letters Patent No. 188,916, dated March 27, 1877; Reissue No. 8,078, dated February 12, 1878; application filed January 9, 1878.

*To all whom it may concern:*

Be it known that we, CHARLES D. JOHNSON and LEVI F. JOHNSTON, of Marshalltown, in the county of Marshall, in the State of Iowa, have invented a new and useful Improvement in Wire Fences and Metallic Posts therefor; and we do hereby declare the following to be a full, clear, and exact description thereof.

The invention relates to the construction of the post and the fastenings by which the wires are attached thereto.

Figure 1:
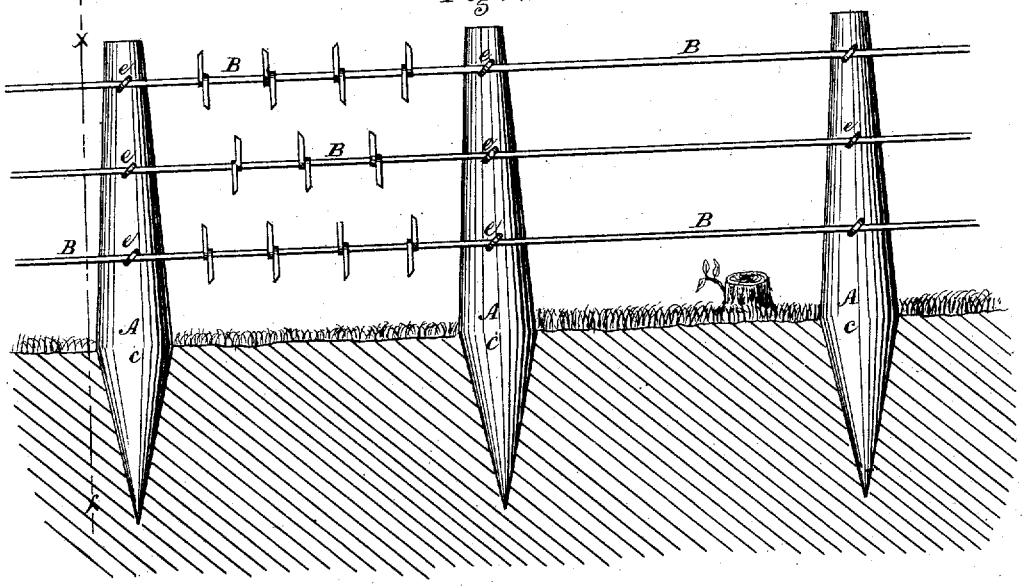
Figure 2:
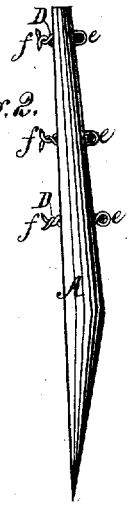
Figure 3:
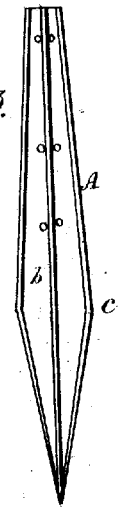

In the accompanying drawings, forming part of this specification, Figure 1 is a front view of a section of fence, showing our improved post and the manner of securing the barbed wires thereto. Fig. 2 is a cross-section on the line *x x*, Fig. 1. Fig. 3 is a rear elevation of our improved post; and Fig. 4 is a cross-section of the post, showing the manner of attaching the wire fastenings.

The posts A (of cast-iron) are made semicircular in cross-section, and are provided, each on the concave side, with a central lengthwise rib, *b*, extending from one end to the other, and are tapered in each direction from the point *c*. The part below said point *c* is driven into the ground, and the remaining portion constitutes the body of the post, to which the barbed wires B are attached.

This form or construction of post secures the desired combination of strength and lightness at minimum cost.

Figure 4:
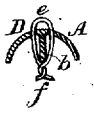

The wires B are attached to the posts by means of fastenings D, which are constructed of short lengths of thick wire, doubled, to form in each an eye, *e*, to receive the wires B, and having their respective ends inserted through holes in the posts on each side of the lengthwise rib *b*, and bent over or across said rib, and twisted together to form projecting points or barbs *f*, as shown in Figs. 2 and 4.

The points *f* prevent cattle rubbing against the posts, and thus serve as protectors for the back of the same. They have also the further advantage that they can be easily and quickly applied or replaced, if broken, and at slight expense.

It is immaterial whether the wires B have barbs attached or not, since the wires do not require to be drawn through the eyes *b* of the fastenings D. But the twisted wire fastenings are of especial advantage in connection with barbed fence-wire, since with such barbed wire the fastenings must be attached after the wire is stretched. The barbs cannot be drawn through a previously-made fastening.

With a view to economy of time and labor in constructing our improved fence, we stretch the wires between two posts situated a considerable distance apart, and then attach them successively to all the intermediate posts by applying the fastenings *e* to the wires, inserting their ends through the holes in the posts, and twisting together their projecting ends, as before stated.

We do not claim, broadly, a concave iron fence-post, nor the attachment of wires to posts by means of staples.

What we claim is—

1. The metallic fence-post A, made semicircular in cross-section, and provided on the concave side with the lengthwise rib *b*, extending from end to end, substantially as shown and described.

2. The combination, with the ribbed posts A and wires B, of the wire fastenings D, having their ends twisted together back of and across the ribs, substantially as shown and described.

In witness whereof we have hereunto set our hands.

CHARLES D. JOHNSON.
LEVI F. JOHNSTON.

Witnesses:
L. P. HARRINGTON,
W. E. SNELLING.